Figure 1:
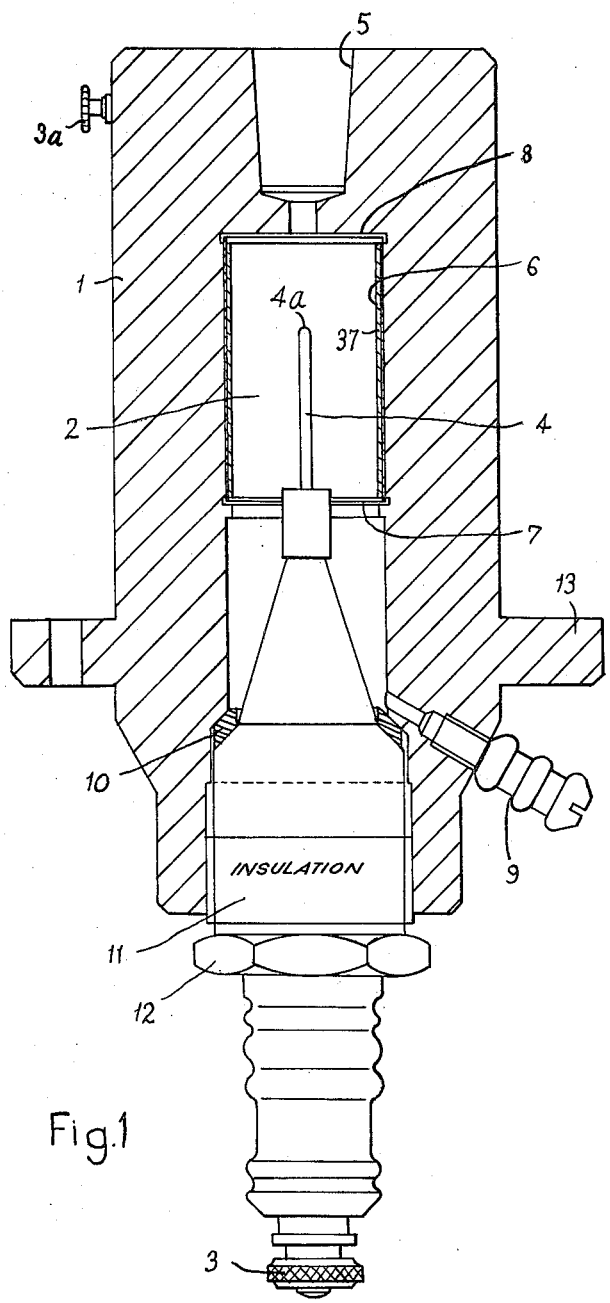

Sept. 17, 1963  F. P. SPEAKMAN ET AL  3,104,320
APPARATUS FOR GAS ANALYSIS
Filed July 27, 1959  5 Sheets-Sheet 3

Inventor
Frank P. Speakman
Laurence Williams
By
Holcombe, Wetherill & Brisebois
Attorney

… …

United States Patent Office 3,104,320
Patented Sept. 17, 1963

3,104,320
APPARATUS FOR GAS ANALYSIS
Frank Peter Speakman and Laurence Williams, Cambridge, England, assignors to Pye Limited, Cambridge, England, a British company
Filed July 27, 1959, Ser. No. 829,809
Claims priority, application Great Britain July 29, 1958
9 Claims. (Cl. 250—43.5)

The present invention relates to apparatus and arrangements for use in gas chromatography and gas analysis.

It is an object of the invention to produce equipment for this purpose which combines high sensitivity and a high degree of accuracy.

It has already been proposed to use an ionisation chamber that includes a radioactive source of radiation and means for electrically energising an electrode therein, whereby the device may operate as a detector for fluid traces carried by a carrier gas through a chromatograph column, the detector device being placed at the outlet of the column, and in which the ionisation current from the device is passed to a suitable recording instrument so as to provide an indication of the kind of fluid carried by the carrier gas and its amount as a function of the ionisation current. According to one feature of the invention there is provided an ionisation chamber for gas chromatography or gas analysis comprising a hollow body defining a cavity, an electric terminal connector mounted in one end of the chamber and having an electrode at its end arranged so that the electrode can be housed within but spaced from the walls of the cavity, a gas inlet at the other end of the chamber, means for holding a radioactive source of radiation within said cavity and spaced from said electrode and a gas outlet spaced from the inlet by the said cavity.

The electrode may be a substantially cylindrical stud or probe or may be in the form of a thin flat disc.

Conveniently the electrode may be mounted on the inner insulator of a standard spark plug, the electric terminal connector referred to also being the usual terminal of the spark plug.

The electrode and the ionisation chamber are normally fed by current at a high voltage and the output of the chamber is ordinarily passed through a series resistance and the voltage drop across this resistance is used to measure the ionisation current through the chamber.

According to another feature of the invention the output of the chamber is linearised by providing a large resistance between the high tension source and an amplifier that is used to amplify said output. This large resistance may be a load resistor for the amplifier or be another resistance additional to the load resistor, in the circuit. By a large resistance is meant a resistance of the order of some thousands of megohms. The value of the load resistor, where separate from said large resistance might be of the order of 100 megohms, depending on the sensitivity of the amplifier.

According to another feature of the invention the sensitivity of an ionisation chamber for gas chromatography or gas analysis is made variable by providing a high tension source having a plurality of high voltage outputs which are adapted to be connected selectively for example, by switch means, to the electrode of the ionization chamber.

In equipments for gas chromatography the chromatograph column and the ionisation chamber are often maintained at a working temperature by electrical heaters which are wound about the column and the ionisation chamber and controlled by a thermostat.

According to another feature of the invention the chromatograph column and the ionisation chamber are integrated so that a single heater may surround both the column and the chamber and whereby the column may be exchanged readily for another as demand dictates.

We have, however, observed that the magnetic field collapsing or building up as the heater windings are switched by the thermostat has a marked effect upon the detector output of the ionisation chamber and thereby produces a transient upon an indicating instrument which may, for example, be a graphic recorder in which case the transient referred to would be produced upon the recorder trace.

According to another feature of the invention, therefore, this disadvantage is substantially removed by winding the heater for the equipment in a bifilar non-inductive fashion.

According to another feature of the invention the heating is made non-linear so that the heat loss throughout the column and the chamber is constant. This non-linearity can be effected by applying extra heat energy at those zones subjected to most heat loss; a convenient way of bringing this about is to concentrate more coils of the heater at the said zones.

Due to the high voltage present in equipment as referred to above it is essential that the equipment be earthed and according to another feature of the invention, in gas chromatography or gas analysis equipment that comprises a high tension source, an ionisation chamber and an amplifier for amplifying the ionisation current, the H.T. supply is made so as to be capable of working above earth potential so that adequate means for suppression of leakages may be incorporated. In this way, the junction of the ionisation chamber and the amplifier may readily be earthed. This arrangement leaves the chamber and the amplifier at earth potential and the H.T. supply can then be suitably isolated from earth.

The carrier gas used is preferably argon because it is relatively cheap and is commercially available in cylinders. However, helium or neon or other rare gases may be used but ordinary commercially available supplies thereof may not be sufficiently pure.

Figure 2:
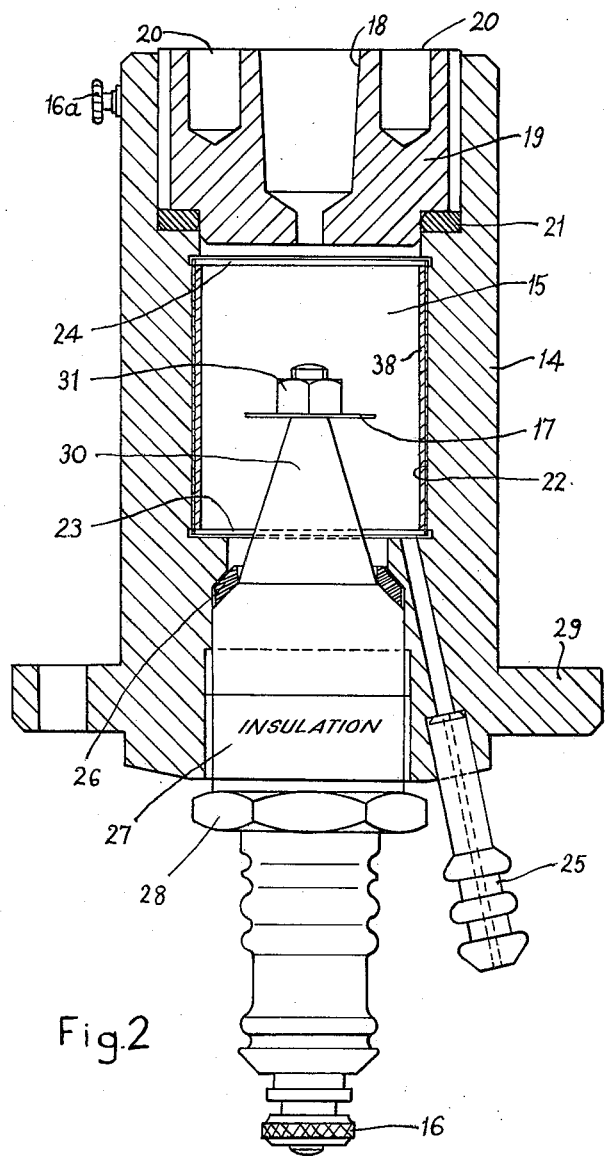
Figure 3:
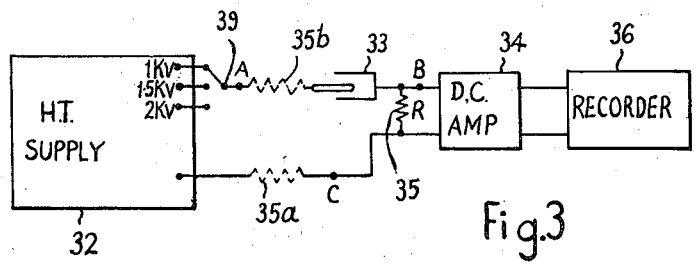
Figure 4:
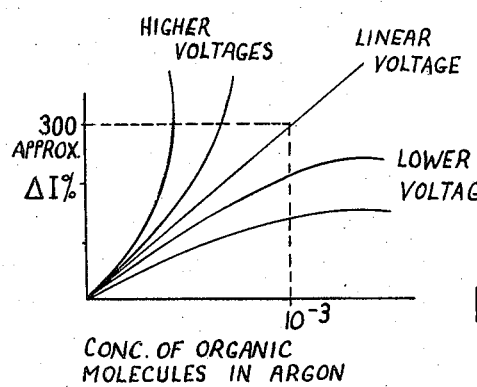
Figure 5:
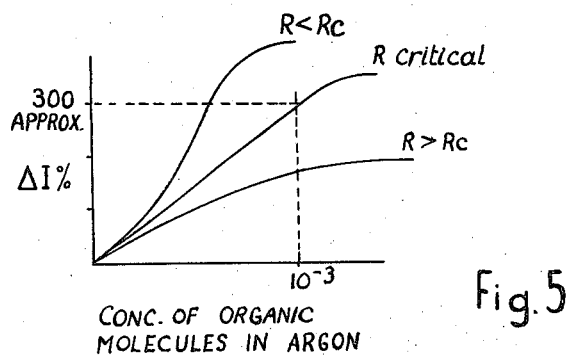
Figure 6:
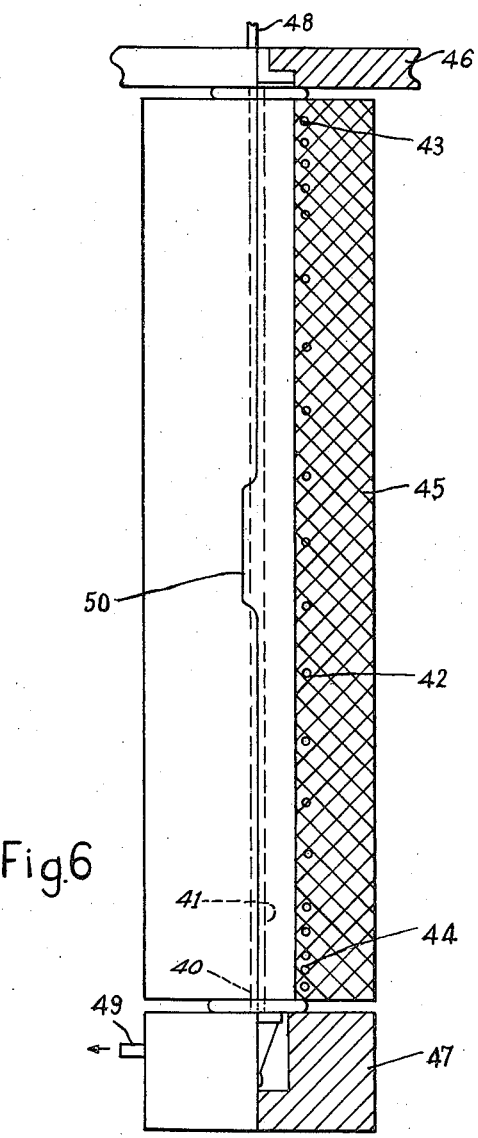
Figure 7:
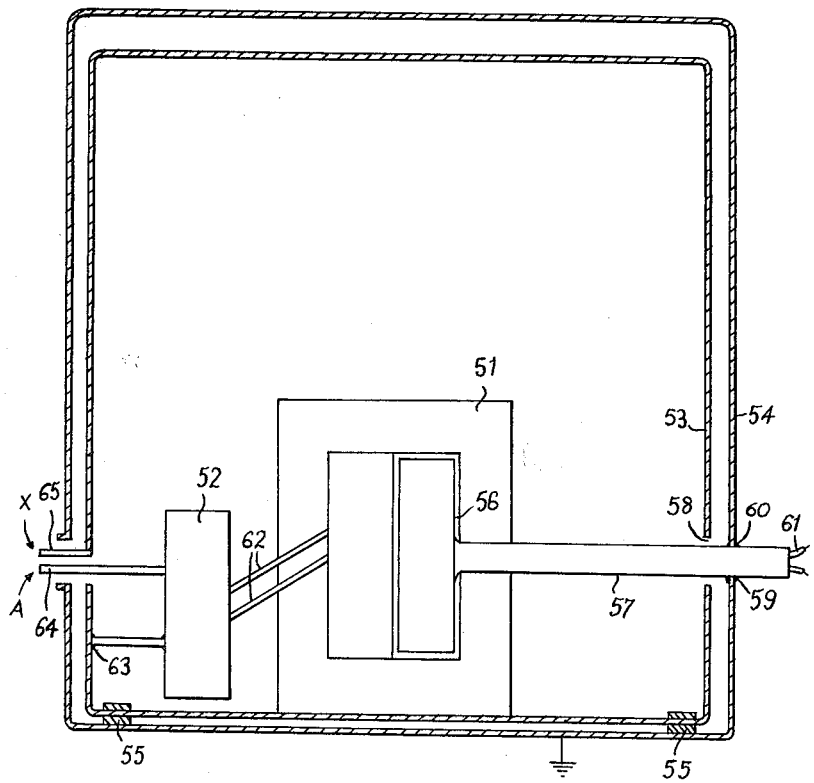

In order that the invention may be more clearly understood reference will now be made to the accompanying drawings which show some specific embodiments thereof by way of example and in which:

FIGURE 1 shows a cross-section through a first embodiment of ionisation chamber, FIGURE 2 shows a cross-section through a second embodiment of ionisation chamber, FIGURE 3 shows a block diagram of certain electrical arrangements, FIGURES 4 and 5 show graphs or curves of various operational desiderata, FIGURE 6 shows an elevation, partly in section and somewhat diagrammatically of an ionisation chamber installed in a gas chromatograph column, and FIGURE 7 shows schematically earthing arrangements for the H.T. supply.

Referring to FIGURE 1 there is shown an ionisation chamber which comprises a hollow body 1 defining a cavity 2 with an electric terminal connector 3 mounted in one end of the chamber and having an electrode 4 at the other end thereof so as to be housed within but spaced from the walls of the recess 2. An external connection to the metal chamber is provided at 3a. An inlet for gas is provided at 5 at the said other end of the chamber and a radioactive source of radiation is shown at 6 on the walls of the cavity. The radioactive material preferably comprises strontium 90 or radium D and the material is firmly encased in metallic foil e.g. silver, gold or platinum foil or a protective coating or covering e.g. of glass. Flanges 7 and 8 are formed at the upper and lower parts of the cavity 2 to retain the radioactive source in position. A gas outlet is shown at 9 which is thus spaced from the inlet 5 by the cavity 2. A sealing washer 10 is provided between an insulator body 11 provided on the electrical terminal connection 3 and the terminal parts are held together by means of a nut 12. The insulator body 11 and the terminal connector 3 and nut 12 are parts of a standard spark plug to which the electrode 4 is secured.

A mounting flange 13 is provided whereby the detector device formed by the ionisation chamber can be mounted on the end of a chromatograph column block, the flange being apertured for the reception of screw bolts or the like; the chamber and the column are thus integrated instead of being separate. The size and shape of the flange may be altered as desired.

For ease of construction it is preferred that the hollow body 1 comprises a metal cylinder and although the foil of radioactive material 6 is shown to be cylindrical many other shapes of source would be suitable.

The electrode 4 is in the form of a thin probe preferably with a rounded termination 4a which is mounted coaxially within the cavity 2 and the diameter of this probe is determined as follows. If the electrode 4 and the cavity 2 have radii in the ratio equal to the Naperian base $\epsilon$ (2.718) the potential gradient at the electrode surface is a minimum for a given applied voltage. This potential gradient determines the operation of the chamber and therefore this ratio requires the highest minimum working voltage. The reduction of the diameter of the electrode 4 increases the ratio and also increases the potential gradient thus resulting in a reduced working voltage without, however, significantly reducing the breakdown voltage: the range of operation of the ionisation chamber voltage is therefore increased. On the other hand an increased radius of the electrode 4 will increase the potential gradient but will also considerably reduce the breakdown voltage and thus limit the range of operation. Therefore, the optimum arrangement in this embodiment is a thin cylinder although mechanical considerations limit the actual diameter as the electrode must be rigid. Therfore, the electrode 4 is made of as small a diameter as possible consistent with rigidity. Moreover, the lower end or tip of the electrode must be kept clear of the lower wall of the cavity 2 and should be shaped to a rounded termination at 4a so as not to reduce the breakdown voltage. The actual longitudinal dimension of the recess is chosen to suit the available sources of radiation energy. As referred to above radium D or strontium 90 are used which are alpha and beta sources respectively and are both commercially available encased in the protective foil. For gas chromatographic purposes the inlet 5 is conveniently placed at the centre as shown so that the chamber may fit into the heater supplied for the chromatograph column. Actually the volume of the cavity 2 is smaller than that of the embodiment shown in FIGURE 2 and this is advantageous for some analysis. If strontium 90 is employed as the source, about 25 mc. are used and if radium D is employed, only 80 $\mu$c. are used. Strontium 90 is a less powerful ionizing agent than radium D and therefore a greater strength thereof must be used but this means that there are more disintegrations per second and there is less stochastic noise.

Referring now to FIGURE 2, the chamber is of similar structure and comprises a hollow body 14 defining a cavity 15 with an electric terminal connector 16 at one end and an electrode 17 at its other end arranged so as to be housed within but spaced from the walls of the cavity 15. An external connection to the metal connector is shown at 16a. The electrode 17, however, is in this case in the form of a flat thin washer. At the said other end of the chamber there is provided a gas inlet 18 which is formed in a removable plug 19 screwed into the body 14 with the aid of a suitable key inserted in cavities 20. A sealing washer 21 is provided between the plug 19 and the said end of the body 14.

The radioactive source is again encased in a cylindrical foil 22 arranged around the inner walls of the cavity 15 and is retained in position by means of flanges 23 and 24. The gas outlet is provided at 25 and this is taken directly from a shoulder in the casing to avoid any pockets or "backwaters" of gas. The insulator body is shown at 27 with the assembly nut 28 simlar to the arrangement of FIGURE 1 and a mounting flange 29, which may take any form found appropriate, is also similarly provided to mount the detector at the end of the chromatograph column.

As referred to above the cavity 15 is larger than the cavity 2 of FIGURE 1 whereby the foil source 22 may be inserted from the gas inlet end of the detector. The plug 19 may be of brass.

Because the electrode 17 is in the form of a thin flat washer, its potential gradient is concentrated around the periphery of the washer (analogous to a point and flat plate instead of the coaxial law which is applicable to the embodiment of FIGURE 1). The breakdown voltage will be governed by the clearance between electrode 17 and the wall of the cavity 15 and the radius of the electrode 17 must be substantially greater than the mounting means. The washer is mounted at the lower end of the pointed termination 30 of the insulator body 27 by means of a nut 31. We have found that if the electrode 17 is in the form of a washer of ½" diameter having a thickness of 0.020 inch this is suitable for a cavity which has a diameter of 1". The detector arrangement of FIGURE 2 will give greater sensitivity, particularly when used with the variable sensitivity arrangement of FIGURE 3 to be described below, than the embodiment of FIGURE 1 and its greatest volume gives suitable sensitivity when used with 10 mcs. of strontium 90 as opposed to the 25 mcs. required in the embodiment of FIGURE 1.

If desired an extra liner 37 or 38 may be inserted into the cavity 2 or 15 respectively to prevent the source reacting with the gas and contaminant passing through the chamber. Such a liner may be of any material found suitable, for example stainless steel, glass or ceramic.

FIGURE 3 shows an electrical arrangement for use in operating the ionisation chambers of FIGURES 1 and 3 and comprises an HT supply source schematically illustrated at 32, the ionisation chamber being represented by 33, connected by the terminal 33a to a D.C. amplifier shown at 34, a large series linearising resistor 35 and an indicating instrument 36. The instrument 36 may be a graphical recording instrument so as to produce a recorded trace. It will be understood that the terminal 33a corresponds to the terminals 3a or 16a of FIGURE 1 or 2 respectively.

In accordance with the invention the HT supply source 32 is provided with a plurality of high voltage outputs, for example 1 kv., 1.5 kv. and 2 kv. and the voltage required is selected in any desired fashion for example by means of a suitable switch, shown diagrammatically at 39. This arrangement gives sensitivities increasing by a factor of approximately 10 which is slightly dependent upon temperature. Users of the arrangements will have to calibrate the scale of the recorder 36 when using the equipment in their own particular operating conditions.

Referring to FIGURE 4, this shows the response curves for a given ionisation chamber with a small resistance at 35 used to measure the ionisation current I. It will be seen from FIGURE 4 that is a larger resistance is placed in series with the chamber 33 then as the current through the chamber increases the voltage across it will decrease which has the effect of correcting the upsweeping curves. This is illustrated in FIGURE 5.

FIGURE 4 shows, for a given chamber, the response with a small resistance at 35 used to measure the ionisation current I and in FIGURE 5 again for a given ionisation chamber with any fixed voltage that is greater than the linear voltage. The maximum change of current $\Delta I$, is approximately three times the standing current (300% of I). It is preferred to limit ΔI to twice the standing current so as to avoid distortion with certain contaminants. At higher voltages the scale of the X-axis is reduced due to the increased sensitivity.

It has been found that for a particular ionisation chamber there is an appropriate value of the resistance 35 to give a linear response with all values of voltage above a minimum Vc. This value Vc is larger than the linear voltage when there is no series resistance at 35. It can be shown that linearity holds until the ionisation current begins to be limited by the resistance at 35. At higher voltages than Vc the scale is reduced due to the increased sensitivity: it is preferred that the percentage ΔI be limited because certain compounds, e.g. chloroform, have peculiar properties of their own and distortion can occur above this level. The available sensitivity which the arrangement of FIGURE 3 provides is particularly valuable in gas chromatography because the longer retention times result in lower peak heights for the same weight of sample and therefore greater sensitivity is required.

The value of the resistance at 35 is not critical within a tolerance of 20% for reasonable linearity and is dependent upon the design of the ionisation chamber and the strength of the radioactive source of radiation.

It is particularly pointed out, however, that the linearising resistor need not be placed at 35 but could be placed at any other part of the circuit between the HT supply 32 and the amplifier 34; for example, it could be placed at 35a or 35b as shown dotted. In this case the resistor at 35 need be only a small load resistor. The value of the high linearising resistance would be of the order of 5000 megohms whereas the value of a load resistor where used, would be only of the order of 100 megohms, depending on the sensitivity of the amplifier.

The high value linearising resistance may also assist in noise limiting for example, in conjunction with the distributed capacitance throughout the circuit and possibly with other circuit parameters.

In equipment of this nature the chromatograph column and the ionisation chamber are separate and often maintained at a specific working temperature by means of electrical heaters which are wound around both the column and the chamber, the temperature being controlled by a thermostat. In accordance with the invention, however, the chamber and the column are integrated by being mounted end to end so that a single heater can be used to heat both. However, we have found that the magnetic field collapses or builds up as the case may be as the heater winding is switched by the thermostat and this has a marked effect upon the ionisation chamber which is sufficient to produce a transient in the indicating instrument which, as mentioned above, may be in the form of a graphic instrument whereby the variation in the magnetic field will produce a transient on the recorder trace. However, in accordance with the invention this drawback can be avoided or substantially minimised by winding the heater in bifilar or non-inductive fashion. This heater can also be made to linearise the heat loss from the apparatus by concentrating the coils to give extra heat energy at those places most susceptible to heat loss.

FIGURE 6 shows schematically how an ionisation chamber according to the invention is integrated with a gas column. This figure is shown half in section so as to show the outside and inside of the integrated assembly. The detector chamber is shown at 40 and the gas column at 41. Since the present invention is not concerned so much with the gas column per se as with the detector, the column is only shown in outside view. The detector is also shown only in outside view in this figure. The detector and the gas column are secured together e.g. by bolts passing through the maintaining flange (e.g. 13 or 29) and a bifilar electric heating coil 42 is located around the assembly, with its final coils at the ends of the column. Since the detector ionisation chamber is located within the column, the detector also will be heated by the coil. Towards the zones of greatest heat loss i.e. at the ends of the column, the heater coil windings are placed close together as shown at 43 and 44 so as to increase the heat transfer at these zones. Surrounding the coil 42 is an insulating jacket 45 e.g. of glass wool. Upper and lower insulator members are provided at 46 and 47, and the heater coil windings may be taken out through the upper insulator, as at 48, and the gas outlet from the detector may be connected to a duct 49 in the lower insulator, as will be apparent to any person skilled in the art: the complete connections have therefore not been shown in the drawing. A gap in the heater insulation is provided at 50 to form a heat reservoir.

The point A, B and C on FIGURE 3 illustrates possible earthing points for the equipment, A being the junction of the HT supply 32 and the chamber 33, B being the junction of the chamber 33 and the D.C. amplifier 34 and C the junction between the HT supply 32 and the amplifier 34.

If the point A is earthed then the D.C. amplifier 34 must be isolated from earth by the full HT voltage. If the point C is earthed, then the ionisation chamber must be isolated and this involves using adequate insulation at high temperatures between the cell and the heater. In accordance with the invention it is desirable that point B be earthed which leaves both the ionization chamber 33 and the D.C. amplifier 34 at earth potential. This is effected by making the HT supply source 32 capable of working above earth potential whereby adequate means for suppression of leakage may be incorporated. The power components of the H.T. supply are mounted upon a separate insulated chassis to prevent any leakage currents to earth which would affect the performance. The power transformer must be on the chassis and capacitance and leakage effects from the primary of the transformer to the chassis must be avoided by screening and preferably the transformer will be double screened.

FIGURE 7 shows appropriate earthing arrangements to fulfill these desiderata. The chassis of the H.T. power unit, of which the transformer is schematically shown at 51, an dthe rectifier and filter unit schematically shown at 52, are mounted in an inner metal case 53. The inner case 53 is supported within an outer case 54 on insulating pillars 55, and the outer case is connected to true earth. The transformer primary is screened in conventional fashion and this screen 56 is connected to a braided conductor 57 which passes through an aperture 58 in the inner case 53 and through an aperture 59 in the outer case 54. The screening braid 57 is connected to the edges of aperture 59 and hence to true earth, by a solder connection 60: the primary input wires 61 pass through the screening braid 57.

The wires 62 from the transformer secondary are passed to the rectifier and filter assembly as schematically shown, and the said assembly is connected to the inner case 53 at 63. The output connections from the assembly are shown at 64 for HT+ and 65 for HT−, connected directly to the inner case 53. Thus, connection 64 is connected to point A on FIGURE 3, and connection 65 is connected to point C on FIGURE 3. Point B on FIGURE 3 is taken to true earth.

This arrangement avoids any coupling capacity between the power supply and the HT supply to the detector, which is important as any A.C. pick-up will upset the amplifier reading. Actually, even a fraction of a picofarad would have an effect upon the accuracy of the readings. The transformer primary is enclosed in a copper can having only a very narrow slit to prevent it acting as a short-circuited turn. It is necessary to avoid capacity to true earth of any part of the power supply, as such capacitance would introduce transient noise in the amplifier output.

We claim:

1. An ionisation chamber for gas analysis comprising a hollow body defining a cavity, an electric terminal connector mounted in one end of said chamber, an electrode connected to said terminal connector, and comprising a cylindrical stub with a rounded termination, said electrode depending into said cavity but spaced from the walls thereof, a gas inlet at the other end of said chamber to face said rounded termination, flange means at the two ends of said cavity for holding a radioactive source of radiation of sheet form against the walls of said cavity, a radiation-passing liner spaced inwardly from the walls of said cavity, and a gas outlet spaced from said gas inlet by the said cavity.

2. An ionisation chamber for gas analysis comprising a hollow body defining a cavity, an electric terminal connector mounted in one end of said chamber, an electrode connected to said terminal connector and depending into said cavity but spaced from the walls thereof, the end of said electrode within said cavity being in the form of a thin flat disc also spaced from the walls of said cavity, a gas inlet at the other end of said chamber, means for holding a radioactive source of radiation within said cavity and spaced from said electrode, and a gas outlet spaced from said gas inlet by said cavity.

3. Ionisation chamber apparatus for gas analysis comprising an ionisation chamber defining a cavity, an electrode mounted in said chamber to project into said cavity, an electric terminal connector connected exteriorly of said chamber to said electrode, a high tension supply source connected to said electric terminal connector, a second electric terminal connector on said chamber, an amplifier connected to said second electric terminal connector and said high tension supply source, and a high value electrical resistor D.C. coupled between said high tension supply source and said amplifier.

4. Ionisation chamber apparatus for gas analysis comprising an ionisation chamber defining a cavity, an electrode mounted in said chamber to depend into said cavity, an electric terminal connector connected to said electrode exteriorly of said chamber, a plurality of high voltage outputs on said high tension supply source, and means for selectively connecting one of said plurality of high voltage outputs to said electrode through said electric terminal connector.

5. Apparatus for gas analysis comprising an ionisation chamber integrated with a gas chromatograph column, and a single bifilar-wound non-inductive electrical heater coil mounted about said integrated column and chamber for heating both of them simultaneously.

6. Apparatus for gas analysis comprising an ionisation chamber integrated with a gas chromatograph column, and a single bifilar-wound non-inductive electrical heater coil mounted about said integrated column and chamber for heating both of them simultaneously; the turns of said coil being spaced closer together at the two ends of said column.

7. Gas analysis apparatus comprising a hollow body defining a cavity, an electric terminal connector mounted on one end of said hollow body, an electrode connected to said terminal connector, and comprising a cylindrical stub with a rounded termination, said electrode depending into said cavity but spaced from the walls thereof, a gas inlet at the other end of said hollow body to face said rounded termination, means for holding a radioactive source of radiation on the walls of said cavity, a gas outlet spaced from said gas inlet by the said cavity, a gas chromatograph column of tubular form connected to said hollow body with the part of said hollow body including said gas inlet located within said column, and a bifilar-wound non-inductive electric heater coil surrounding said column, the turns of said coil being spaced closer together at the two ends of said column.

8. Gas analysis apparatus comprising an ionisation chamber, a high tension supply source connected to said chamber, an implifier D.C. coupled to said chamber, and means connecting the common connection of said amplifier and said chamber to ground to allow said high tension supply source to work above earth potential.

9. Gas analysis apparatus comprising an ionisation chamber, a high tension supply source including a transformer connected to said chamber, an amplifier also connected to said chamber, a first casing surrounding said high tension supply source, a second casing surrounding said first casing and insulated therefrom, an electrostatic screen around the primary of the transformer of said high tension supply source, current supply conductors passing through said two casings to said primary of said transformer, a screening member around said conductors, said screening member being connected to said electrostatic screen and passing freely through said first casing and electrically connected to said second casing, the output of said high tension supply source passing through said first and second casings with high tension negative connected to said inner casing, and means for connecting said second casing to true earth.

References Cited in the file of this patent

UNITED STATES PATENTS

| | | |
|---|---|---|
| 2,106,689 | Brazelton | Jan. 25, 1938 |
| 2,433,554 | Herzog | Dec. 30, 1947 |
| 2,477,802 | Herzog | Aug. 2, 1949 |
| 2,641,710 | Pompeo | June 9, 1953 |
| 2,662,188 | Crumrine | Dec. 8, 1953 |
| 2,740,894 | Deisler | Apr. 3, 1956 |
| 2,756,350 | Reisner | July 24, 1956 |
| 2,968,730 | Morris | Jan. 17, 1961 |
| 2,987,459 | Labeyrie et al. | June 6, 1961 |

FOREIGN PATENTS

| | | |
|---|---|---|
| 398,722 | Great Britain | Sept. 21, 1933 |

OTHER REFERENCES

A Radiological Detector for Gas Chromatography by Deal et al., Analytical Chemistry, vol. 28, No. 12, April 1956, pages 1958 to 1964.

Vapor Phase Chromatography by Desty, Butterworths Scientific Publications, 1957, London, pages 169 to 184.